(12) United States Patent
Fukuda

(10) Patent No.: US 7,689,065 B2
(45) Date of Patent: Mar. 30, 2010

(54) IMAGE PROCESSING METHOD AND APPARATUS FOR SUPPRESSING POSITIONAL SHIFT IMAGE DEGRADATION

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1190 days.

(21) Appl. No.: 10/990,375

(22) Filed: Nov. 18, 2004

(65) Prior Publication Data

US 2005/0110882 A1 May 26, 2005

(30) Foreign Application Priority Data

Nov. 21, 2003 (JP) ............... 2003-392075
Sep. 17, 2004 (JP) ............... 2004-272524

(51) Int. Cl.
*G06K 9/00* (2006.01)
*G06K 9/40* (2006.01)

(52) U.S. Cl. .............. 382/318; 382/319; 382/264

(58) Field of Classification Search ............. 382/318, 382/319, 162, 264, 282, 299
See application file for complete search history.

(56) References Cited

U.S. PATENT DOCUMENTS 5,617,135 A * 4/1997 Noda et al. ............. 348/14.12

(Continued)

FOREIGN PATENT DOCUMENTS

JP 2000-333002 11/2000

(Continued)

OTHER PUBLICATIONS

Jobson et al. "A Multiscale Retinex for Bridging the Gap Between Color Images and the Human Observation of Scenes," IEEE Transactions on Image Processing, Jul. 1997, vol. 6, No. 7.

(Continued)

*Primary Examiner*—Samir A. Ahmed
*Assistant Examiner*—Li Liu
(74) *Attorney, Agent, or Firm*—Fitzpatrick, Cella, Harper & Scinto

(57) ABSTRACT

There are provided an image processing method and apparatus which can reduce the storage capacity required to form low-frequency components having a plurality of resolutions and can suppress any degradation in image quality which is caused by a positional error between image data obtained as a result of image processing. The first luminance component of low resolution is extracted from image data, thereby further extracting the first low-frequency component. The image data is input at the second resolution, the second luminance component is extracted from the image data at the second resolution, and the second low-frequency component is extracted, thereby further extracting the second low-frequency component. Image processing is performed for the image data at the second resolution using the first low-frequency component and second low-frequency component.

8 Claims, 9 Drawing Sheets

U.S. PATENT DOCUMENTS

| | | | | |
|---|---|---|---|---|
| 5,920,342 | A * | 7/1999 | Umeda et al. | 348/211.14 |
| 6,128,021 | A * | 10/2000 | van der Meulen et al. | 345/428 |
| 6,151,426 | A * | 11/2000 | Lee et al. | 382/319 |
| 6,314,452 | B1 * | 11/2001 | Dekel et al. | 709/203 |
| 6,377,703 | B1 * | 4/2002 | Yeung | 382/173 |
| 6,718,059 | B1 * | 4/2004 | Uchida | 382/176 |
| 6,751,349 | B2 | 6/2004 | Matama | 382/167 |
| 6,801,636 | B2 | 10/2004 | Murakami et al. | 382/100 |
| 6,980,332 | B2 * | 12/2005 | Simske | 358/445 |
| 2002/0032027 | A1 * | 3/2002 | Kirani et al. | 455/426 |
| 2002/0118891 | A1 * | 8/2002 | Rudd et al. | 382/282 |
| 2005/0169551 | A1 * | 8/2005 | Messing et al. | 382/260 |

FOREIGN PATENT DOCUMENTS

| | | |
|---|---|---|
| JP | 2001-154281 | 6/2001 |
| JP | 2001-218010 | 8/2001 |

OTHER PUBLICATIONS

Reinhard et al., "Photographic Tone Reproduction for Digital Images," ACM Transactions on Graphics, Jul. 2002, vol. 21, No. 3.
Japanese Communication dated Feb. 13, 2009, regarding Application No. 2004-272524.

* cited by examiner

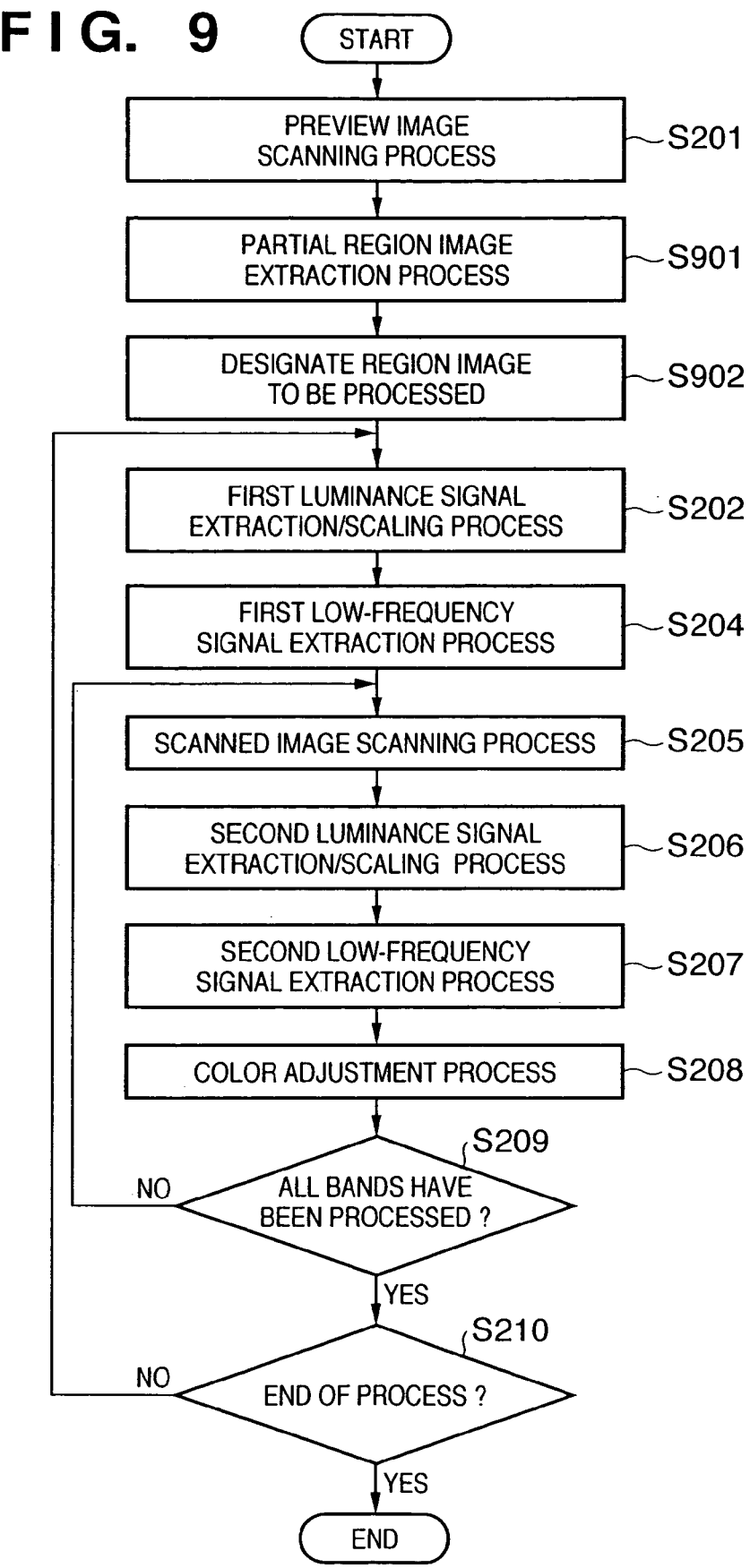

IMAGE PROCESSING METHOD AND APPARATUS FOR SUPPRESSING POSITIONAL SHIFT IMAGE DEGRADATION

FIELD OF THE INVENTION

The present invention relates to an image processing method and apparatus which perform image processing using low-frequency components.

BACKGROUND OF THE INVENTION

A method of measuring the average luminance of a scene to be photographed and controlling the shutter speed, f-number, and the like of a camera is conventionally known as a method of taking a picture with proper brightness. There is also known an exposure control method using a so-called evaluation photometry method of dividing a scene into predetermined regions, weighting the luminance measured for each region, and calculating the average luminance to obtain the correct exposure.

However, in a so-called back light scene where a main object to be photographed is much darker than the background, the main object becomes dark in a photographed image. To take a picture with proper brightness in this back light scene, the exposure of a camera must be set such that the picture is taken to be brighter than an average picture in photography. This exposure correction operation is troublesome, and a skilled technique is required to set the camera properly. Any user cannot always make settings easily. Even if exposure correction is properly performed for the main object, the background portion may become too bright.

In analog photography, prints with proper brightness can be obtained by performing so-called dodging in a darkroom. To obtain a digital image with proper brightness, it is desirable to implement this dodging in digital image processing.

As a method of implementing this process, a technique for improving an image by, e.g., calculating a difference between a component obtained by logarithmically transforming a digital image and a low-frequency component of the logarithmically transformed component, darkening a bright component in a low-frequency region of the digital image, and brightening a dark component in the low-frequency region (see, e.g., non-patent reference 1).

There is proposed a method of obtaining an effect as that obtained by dodging in digital image processing by using a luminance component and its low-frequency component (see, e.g., non-patent reference 2).

Non-patent reference 1 is Jobson et al., "A Multiscale Retinex for Bridging the Gap Between Color Images and the Human Observation of Scenes", IEEE TRANSACTIONS ON IMAGE PROCESSING, July 1997, Vol. 6, No. 7, and non-patent reference 2 is Reinhard et al., "Photographic Tone Reproduction for Digital Images", ACM Transactions on Graphics, July 2002, Vol. 21, No. 3.

However, to extract low-frequency luminance components of a digital image at a plurality of resolutions, particularly as for an image of low resolution, a relatively large region of the original image of the digital image (to be referred to as "original digital image" hereinafter) must be referred to. To refer to the original image, a method of storing the digital image in a storage device can be considered. This method, however, requires a large storage area to store the digital image.

Accordingly, if a large storage area cannot be ensured or a storage area needs to be removed, this method cannot be adopted when, e.g., a scanner device is used.

Under the circumstances, as another method, a method of scanning the original digital image twice, generating a low-frequency component of the digital image by the first scanning, and correcting a digital image obtained by the second scanning using the low-frequency luminance component generated by the first image scanning can be considered.

However, the image obtained by the first scanning may not accurately coincide with the image obtained by the second scanning, depending on the control precision of the head position of a scanner device. In this case, an outline like a blur may occur at an edge portion of the corrected image.

SUMMARY OF THE INVENTION

The present invention has been proposed to solve the conventional problems, and has as its objects to provide an image processing method and apparatus which reduce the storage capacity required to generate low-frequency components having a plurality of resolutions and can suppress any degradation in image quality which is caused by a positional shift between image data obtained as a result of image processing.

In order to solve the problems, according to the present invention, there is provided an image processing method comprising a first acquisition step of acquiring first image data indicating an original image, a first luminance extraction step of extracting a first luminance component from the first image data, a first low-frequency extraction step of extracting a first low-frequency component from the first luminance component, a second acquisition step of acquiring second image data indicating the original image, a second luminance extraction step of extracting a second luminance component from the second image data, a second low-frequency extraction step of extracting a second low-frequency component from the second luminance component and an image processing step of performing image processing for the second image data using the first low-frequency component and second low-frequency component, wherein a resolution of the first low-frequency component is lower than a resolution of the second low-frequency component.

In order to solve the problems, according to the present invention, there is provided the method wherein a resolution of the first image data is lower than a resolution of the second image data.

In order to solve the problems, according to the present invention, there is provided the method wherein the second acquisition step, second luminance extraction step, second low-frequency extraction step, and image processing step are performed for each of a plurality of regions into which the second image data indicating the original image is segmented in a subscanning direction.

In order to solve the problems, according to the present invention, there is provided the method further comprising a holding step of holding the second luminance component by a predetermined number of last lines of an immediately processed segmented region, wherein the predetermined number of lines are determined on the basis of a size of a processing region of a low-frequency signal extraction process to be performed for pixels in the second low-frequency extraction process.

In order to solve the problems, according to the present invention, there is provided the method further comprising a preview step of performing preview on the basis of the first image data.

In order to solve the problems, according to the present invention, there is provided the method wherein in the first acquisition step and second acquisition step, the original image is scanned, and the first image data and the second image data whose resolution is lower than a resolution of the first image data, respectively, are acquired.

In order to solve the problems, according to the present invention, there is provided the method further comprising a preview input step of optically scanning a plurality of documents arranged on a scanning surface and inputting a plurality of preview images and a selection step of selecting a preview image in accordance with an instruction from a user, from the plurality of preview images, wherein the original image scanned in the first acquisition step and second acquisition step is a document corresponding to the preview image selected in the selection step.

In order to solve the problems, according to the present invention, there is provided an image processing apparatus comprising first acquisition unit configure to acquire first image data indicating an original image, first luminance extraction unit configure to extract a first luminance component from the first image data, first low-frequency extraction unit configure to extract a first low-frequency component from the first luminance component, second acquisition unit configure to acquire second image data indicating the original image, second luminance extraction unit configure to extract a second luminance component from the second image data, second low-frequency extraction unit configure to extract a second low-frequency component from the second luminance component and image processing unit configure to perform image processing for the second image data using the first low-frequency component and second low-frequency component, wherein a resolution of the first low-frequency component is lower than a resolution of the second low-frequency component.

In order to solve the problems, according to the present invention, there is provided a program causing a computer to execute a first acquisition procedure for acquiring first image data indicating an original image, a first luminance extraction procedure for extracting a first luminance component from the first image data, a first low-frequency extraction procedure for extracting a first low-frequency component from the first luminance component, a second acquisition procedure for acquiring second image data indicating the original image, a second luminance extraction procedure for extracting a second luminance component from the second image data, a second low-frequency extraction procedure for extracting a second low-frequency component from the second luminance component and an image processing procedure for performing image processing for the second image data using the first low-frequency component and second low-frequency component, wherein a resolution of the first low-frequency component is lower than a resolution of the second low-frequency component.

In order to solve the problems, according to the present invention, there is provided a computer-readable recording medium storing the program above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart for explaining the flow of processing in an image processing apparatus according to the second embodiment.

DETAILED DESCRIPTION OF THE PREFERRED EMBODIMENTS

First Embodiment

Figure 1:
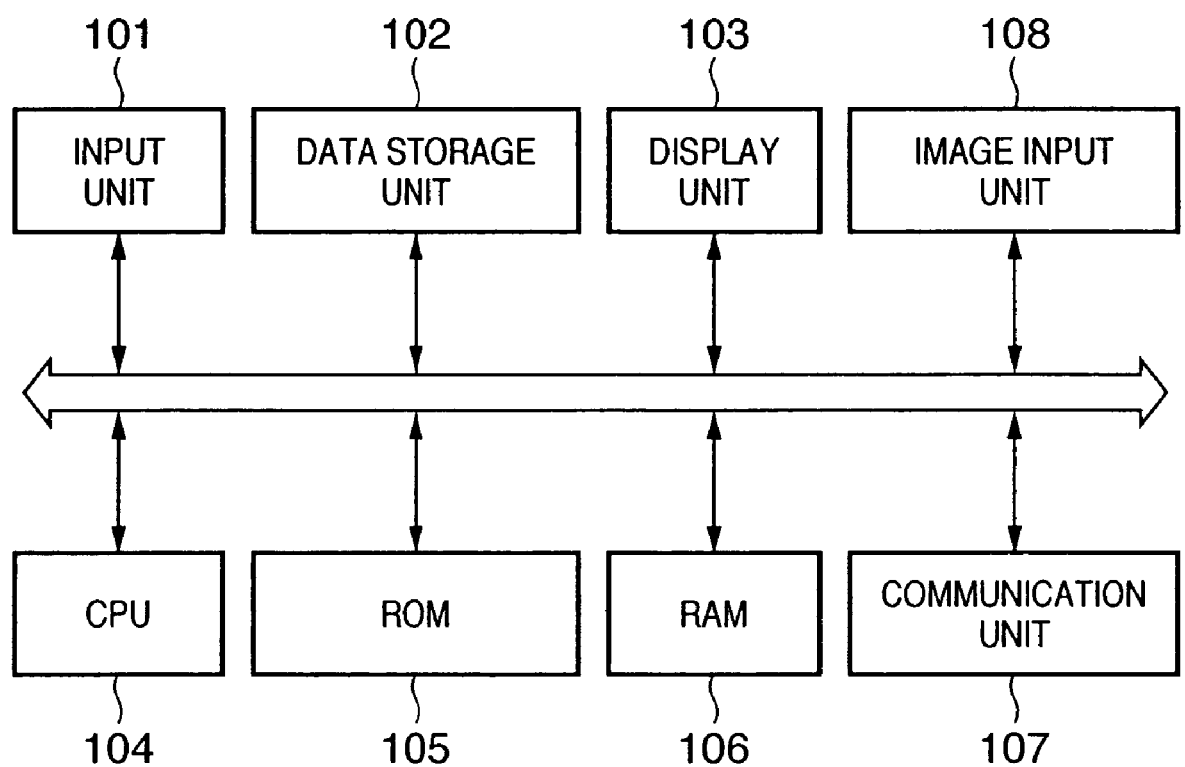
FIG. 1 is a block diagram showing the arrangement of an image processing apparatus which can implement an image processing method according to the first embodiment.

FIG. 1 is a block diagram showing the arrangement of an image processing apparatus which can implement an image processing apparatus according to the first embodiment of the present invention. In FIG. 1, an input unit 101 is used to input an instruction or data from the user and comprises a keyboard, pointing device, and the like. Note that examples of pointing devices include a mouse, trackball, track pad, tablet, and the like. If this embodiment is applied to, e.g., a digital camera device, the input unit 101 comprises a button, mode dial, and the like. Alternatively, a keyboard may be constituted by software (software keyboard), and characters may be input by operating a button, mode dial, or pointing device.

A data storage unit 102 stores image data and generally comprises a fixed or portable storage device or the like such as a hard disk, flexible disk, CD-ROM, CD-R, DVD, memory card, CF card, smart media, SD card, memory stick, or xD picture card. The data storage unit 102 can store a program or other data in addition to image data. If a RAM 106 can have a storage capacity sufficiently large enough to store an intermediate image (luminance component image) to be described later or the like, the data storage unit 102 may be omitted to, e.g., reduce the cost.

A communication unit 107 is an interface (I/F) for inter-device communications. The communication unit 107 may adopt a known wired communication method such as Ethernet (registered trademark), USB, IEEE1284, IEEE1394, telephone line or a known wireless communication method such as infrared radiation (IrDA), IEEE802.11a, IEEE802.11b, IEEE802.11g, Bluetooth, UWB (Ultra Wide Band).

A display unit 103 is used to display a digital image before or after image processing or an image of GUI or the like. A CRT, liquid crystal display, or the like is generally used as the display unit 103. The display unit 103 may comprise an external display device connected to the apparatus through a cable or the like.

A CPU 104 performs processing using the above-mentioned components. A ROM 105 and the RAM 106 provide a program, data, work area, and the like necessary for processing by the CPU 104 to the CPU 104. If a control program necessary for a process to be described later is stored in the data storage unit 102 or ROM 105, the control program is executed after being loaded into the RAM 106.

An image input unit 108 comprises a CCD and the like. The image input unit 108 inputs an image and stores the image in the RAM 106 or data storage unit 102. In this embodiment, an image corresponding to the entire region of an image document need not always be input at a time. If the RAM 106 or data storage unit 102 has a sufficiently large storage capacity, the entire image may be stored.

In the image processing apparatus in FIG. 1, the input unit 101, data storage unit 102, display unit 103, and image input unit 108 are connected to each other through an internal bus 109. These components, however, may be connected through a communication path using a known communication method.

As components of an image processing system, there are available various components in addition to the above-mentioned ones. Such components are irrelevant to the present invention, and a description thereof will be omitted.

Figure 2:
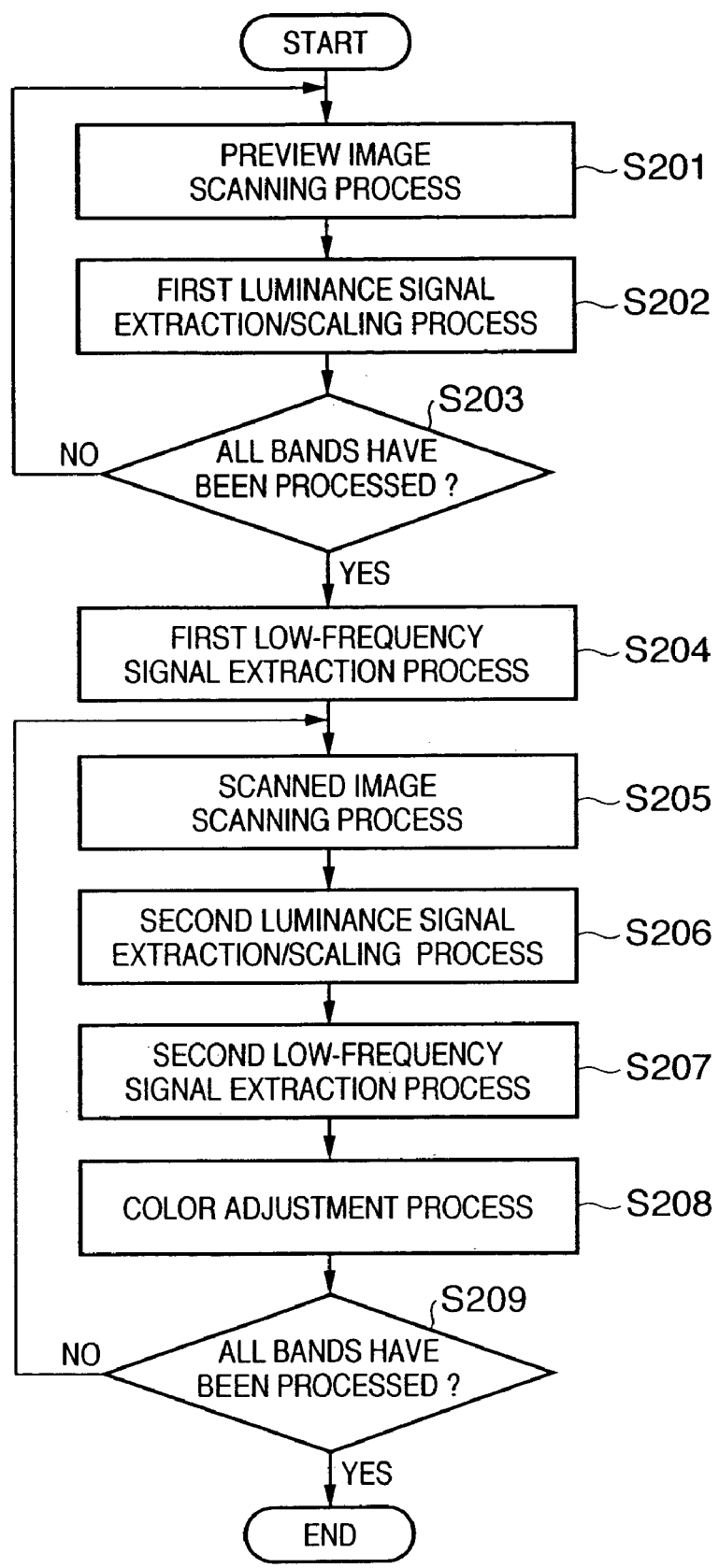
FIG. 2 is a flowchart for explaining the processing procedure for image processing by an image processing apparatus according to the first embodiment.

FIG. 2 is a flowchart for explaining the processing procedure for image processing by the image processing apparatus according to the first embodiment. A digital image serving as a target for color adjustment processing of the flowchart shown in FIG. 2 is stored in the RAM 106 or data storage unit 102 shown in FIG. 1. The digital image as the color adjustment target is selected from a list of stored images displayed on the display unit 103 in accordance with the user's instruction using the input unit 101. This is effective in, e.g., scanning a plurality of images at low resolution at the first image scanning and re-scanning a designated image at high resolution. Alternatively, operation of the input unit 101 by the user may trigger (the first) image input from the image input unit 101, and the obtained image data may be stored in the RAM 106 or data storage unit 102, thereby performing the process described with reference to the flowchart shown in FIG. 2.

In digital image color adjustment processing, the luminance distribution of a digital image to be input to the image processing apparatus is checked, and a luminance image is generated as the check result, as will be described later in this embodiment. The luminance image undergoes two-dimensional filtering to extract a low-frequency component, thereby generating a low-frequency luminance image. This luminance image generation processing and low-frequency luminance image generation processing are performed at a plurality of resolutions. Digital image color adjustment is performed while referring to low-frequency luminance images of the plurality of resolutions and the original digital image. A specific description of color adjustment will be given later.

As for a luminance image of relatively low resolution and low-frequency luminance image, a wide area of an original image needs to be referred to in reduction processing or two-dimensional filtering. For example, assume that a low-frequency luminance image (or low-resolution low-frequency luminance image) comprises about 15×15 pixels, and two-dimensional filtering is performed in 5×5 pixels. In this case, a region of (⅓ the height of the original image)×(⅓ the width) needs to be referred to at a time.

This need is satisfied by buffering the entire input image, which in turn requires a vast storage area. For example, if the image input unit 108 comprises a scanner device, and a color document having a size of A4 (297 mm×210 mm) is scanned at a resolution of 1,200 dpi, obtained image data comprises about 140,000,000 pixels. Even when each channel (RGB) of a pixel comprises 8 bits, a storage area of about 400 Mbytes is necessary.

To reduce the buffer capacity, there can be considered a band process which splits an image in the subscanning direction and performs processing for split images. However, in band processing, there is a limit to a range in the subscanning direction which can be referred to at a time. Even if an attempt is made to perform processing at a time in scanning an image to be subjected to the final color correction, a low-frequency luminance image required to correct a band image to be corrected cannot be generated. To avoid this, there can be considered a method of buffering a band image. This method can reduce the size of a storage area as compared to a method of buffering the entire image but still requires a large storage area. For example, in the above-mentioned example, about a third of the original image in the subscanning direction need only be buffered. If the size of an original image is 400 Mbytes, as in the example, a third of the original image has a size of about 130 Mbytes, and a huge storage area is still necessary.

In a scanner device or the like, an image may be scanned at low resolution (prescan or preview) for the purpose of confirming the image, prior to the final image scanning. Accordingly, there can be considered a method of creating a low-frequency luminance image using this preview image. However, in the scanner device or the like, in some cases, the first scanned image and the second scanned image may not accurately correspond with each other. In this case, an outline such as a blur may occur at an edge portion of the corrected image.

Figure 5:
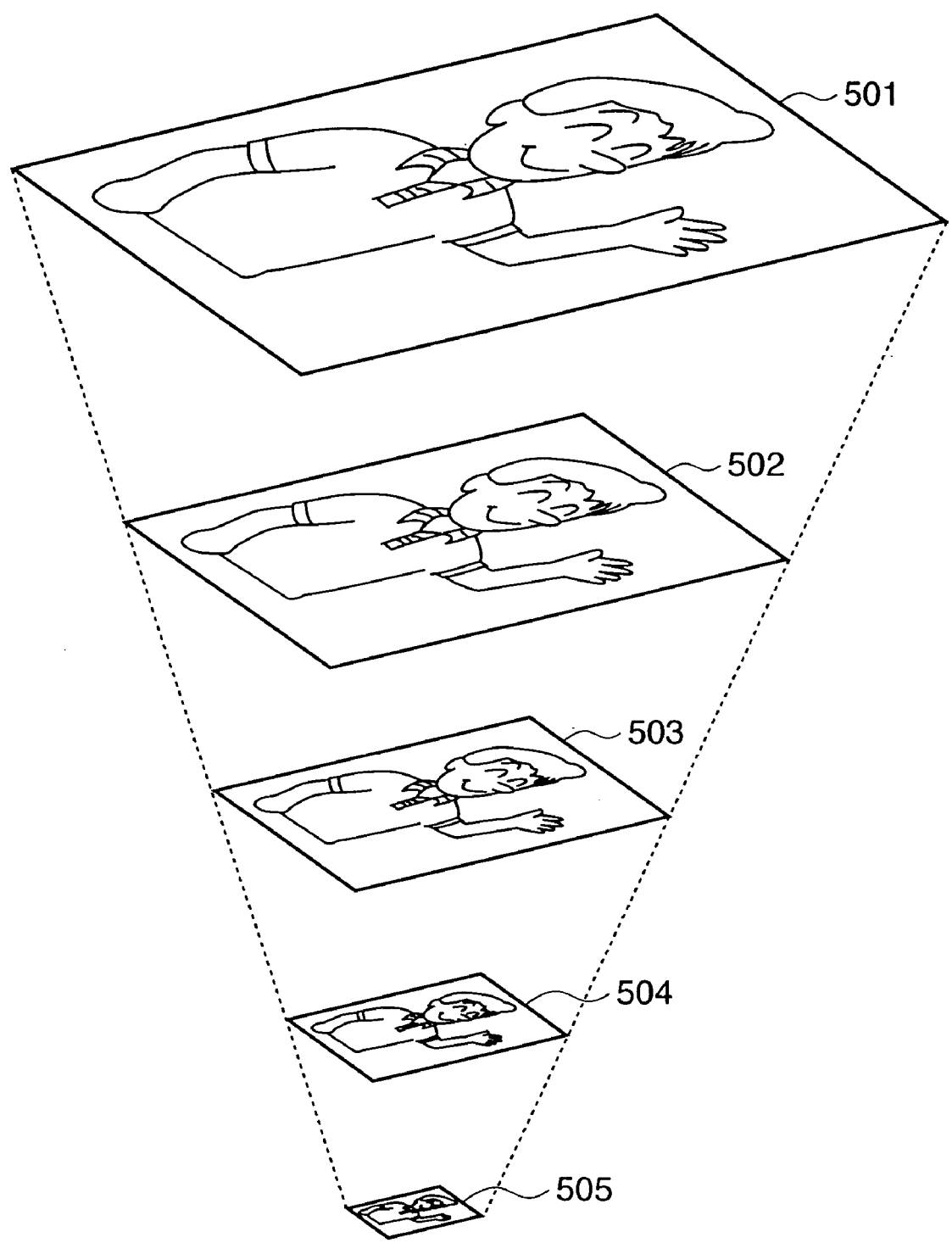
FIG. 5 is a view showing the relationship among a preview view, a scanned image, a high-resolution luminance image (or a high-resolution low-frequency luminance image generated from it), an intermediate-resolution luminance image (or an intermediate-resolution low-frequency luminance image generated from it), and a low-resolution luminance image (or a low-resolution low-frequency luminance image generated from it)

FIG. 5 is a view showing the relationship among a preview view, a scanned image, a high-resolution luminance image (or a high-resolution low-frequency luminance image generated from it), an intermediate-resolution luminance image (or an intermediate-resolution low-frequency luminance image generated from it), and a low-resolution luminance image (or a low-resolution low-frequency luminance image generated from it). In FIG. 5, reference numeral 501 denotes a scanned image; 502, a high-resolution luminance image; 503, a preview image; 504, an intermediate-resolution luminance image; and 505, a low-resolution luminance image.

The example shown in FIG. 5 is merely an example. In FIG. 5, the high-resolution luminance image 502 is larger than the preview image 503. This is just a preferred arrangement example. The high-resolution luminance image 502 may be larger than the preview image 503.

In FIG. 5, the high-resolution luminance image 502 is smaller than the scanned image 501. However, the high-resolution luminance image 502 need not always be smaller than the scanned image 501. The high-resolution luminance image 502 may be equal in size (resolution) to the scanned image 501. Similarly, the preview image 503 may be equal in resolution to the intermediate-resolution luminance image 504 or low-resolution luminance image 505.

Each of the high-resolution luminance image 502, intermediate-resolution luminance image 504, and low-resolution luminance image 505 may have an arbitrary size or predetermined size. The size of each image may be determined in accordance with the resolution (the number of pixels) of the scanned image 501 or preview image 503. The long side of the low-resolution luminance image 505 is preferably about 15 pixels long (the short side may be determined in accordance with the aspect ratio of the preview image 503 or scanned image 501). Preferably, the high-resolution luminance image 502 is about 1/1 to 1/4 in length and width the scanned image or the long side of the high-resolution luminance image 502 is about 1,000 pixels (the short side may be determined in accordance with the aspect ratio of the preview image 503 or scanned image 501). The intermediate-resolution luminance image 504 is set to be smaller than the high-resolution luminance image 502 and to be larger than the low-resolution luminance image 505. More preferably, the intermediate-resolution luminance image 504 is set to have lower resolution than the preview image 503.

The positional relationship between the contents of the preview image 503 and that between the contents of the scanned image 501 do not always completely coincide with each other. For example, if the image input unit 108 is arranged to scan an image while moving its head like a scanner device, a shift of several pixels may occur in the preview image 503 depending on the position control precision of the head. Even in this case, if the intermediate-resolution luminance image 504 and low-resolution luminance image 505 are sufficiently smaller than the preview image 503, the shift decreases to have a magnitude of one pixel or less in the intermediate-resolution luminance image 50.4 and low-resolution luminance image 505. For this reason, the effect of a shift between the preview image 503 and the scanned image 501 can be neglected in the intermediate-resolution luminance image 504 and low-resolution luminance image 505.

Under the circumstances, a luminance image of relatively low resolution (and low-resolution low-frequency luminance image) is generated using a preview image obtained by the first image scanning processing, and a high-resolution luminance image (and high-resolution low-frequency luminance image) is generated using a scanned image obtained by the second image scanning processing. With this operation, a problem of positional errors is solved while the storage capacity is reduced. The flow of the actual processing will be described with reference to the flowchart shown in FIG. 2.

An image to be scanned will be explained as an image having undergone band split in the following description. Even if band split is not to be performed, the processing can be performed in the same manner using the image processing method described in this embodiment by considering that the number of band is 1.

According to the flowchart of FIG. 2, in the image processing apparatus according to this embodiment, a preview image is first input (step S201). In this step, a portion corresponding to one band out of a low-resolution image (preview image) is scanned from the image input unit 108 and is stored in the RAM 106 or data storage unit 102.

In this embodiment, luminance images of three different resolutions, i.e., the high-resolution luminance image 502, intermediate-resolution luminance image 504, and low-resolution luminance image 505 are used, as shown in FIG. 5. The number of resolutions need only be more than one and need not always be three. More specifically, the intermediate-resolution luminance image 504 may not be generated. Alternatively, a luminance image of another intermediate resolution and a low-frequency luminance image generated from the intermediate-resolution luminance image may be formed.

An intermediate-resolution luminance image may be generated from any one of the preview image 503 and the scanned image 501. In terms of memory savings, this image is preferably generated from the preview image 503. In this case, a process of generating an intermediate-resolution luminance image and low-frequency luminance image is performed together with a luminance signal extraction/scaling process in step S202. On the other hand, a process of generating an intermediate-resolution luminance image and low-frequency luminance image from the scanned image 501 is performed together with a luminance signal extraction/scaling process in step S204.

Figure 3:
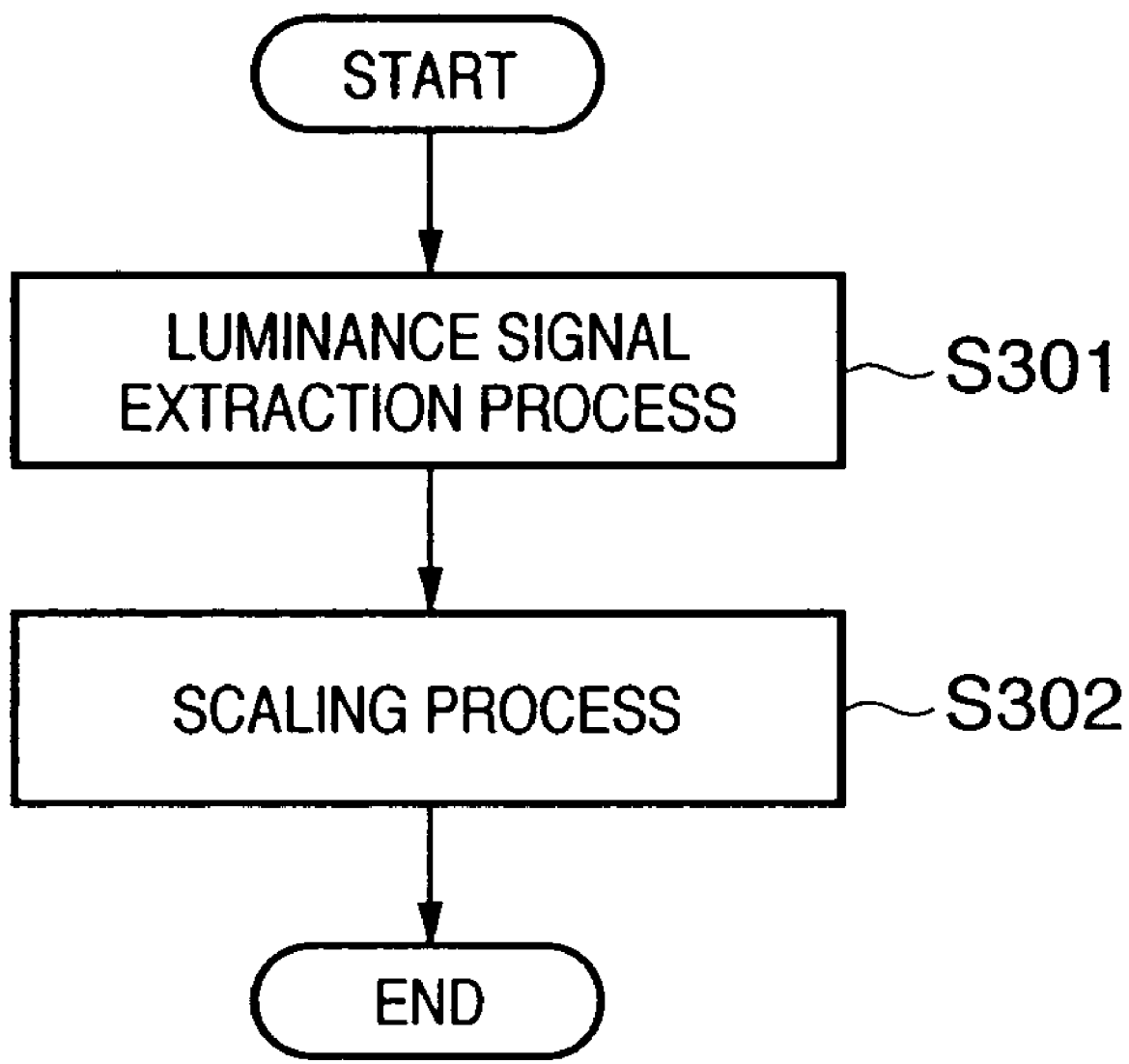
FIG. 3 is a flowchart for explaining the details of a luminance signal extraction process for scalable luminance images having different resolutions in step S202.

Using the preview image scanned in step S201, the first luminance signal extraction/scaling process is performed (step S202). The first luminance signal extraction/scaling process in this embodiment generates an intermediate-resolution luminance image and low-resolution luminance image are generated. FIG. 3 is a flowchart for explaining the details of a luminance signal extraction process for scalable luminance images having different resolutions in step S202.

As shown in FIG. 3, the luminance signal extraction process first extracts a luminance component from the input image (step S301). As for luminance component extraction, if an image to be subjected to color adjustment is represented as an sRGB color space described in IEC61996-2-1, the image is converted into CIE1931XYZ by gamma conversion and 3×3 matrix calculations in accordance with a method described in IEC61996-2-1. Assume that X, Y, and Z data obtained after a pixel value (R(x,y), G(x,y), B(x,y)) whose coordinates in the image are (x,y) is converted by the above-mentioned conversion are X(x,y), Y(x,y), and Z(x,y), respectively. In this case, Y(x,y) is an extracted luminance component while X(x,y) and Z(x,y) are color components. To implement this luminance extraction by hardware, a table lookup circuit (for gamma conversion) based on a lookup table and matrix calculation circuit can be used.

To extract a luminance component, the above-mentioned process may be simplified by omitting gamma conversion and performing only matrix calculations. Instead of CIE1931XYZ, the following modifications may be adopted:

the Y value of a YCbCr color space is used as a luminance component, and the Cb and Cr values are used as color components;

the L* value of an L*a*b* color space is used as a luminance component, and the a* and b* values are used as color components;

the V value of an HSV color space is used as a luminance component, and the H and S values are used as color components; and the L value of an HSL color space is used as a luminance component, and the H and S values are used as color components.

In this case, a color conversion process corresponding to each modification is used.

It is preferable to employ a color space conversion process defined by a predetermined standard or the like. However, approximate calculation may be used instead. As an example, conversion from a Y value in an RGB color space to that in a YCbCr color space is represented by a conversion expression (1):

$$Y = 0.299 \times R + 0.587 \times G + 0.114 \times B \tag{1}$$

Alternatively, an approximate expression (2) may be used:

$$Y = \frac{3 \times R + 6 \times G + B}{10} \tag{2}$$

The G component of an RGB signal value may be used as an approximate value of a luminance components or the average value or maximum value of RGB signal values may be used as a luminance.

This embodiment has described that an input image is represented as an sRGB color space. An RGB other than sRGB (e.g., Adobe RGB, RIMM/ROMM RGB, or the like) may be used. In this case, the input image may be converted into CIE1931XYZ (or any of the above-mentioned color spaces) in accordance with the definition of the color space.

Each color space may be converted in accordance with the definition of the color space or a conversion expression. Alternatively, conversion may be made using a known ICC profile or the like. This is effective if an RGB used has a device-dependent RGB value (device RGB value), and the value cannot be represented by a simple conversion expression.

If the input image is not represented by RGB but by sYCC as well, color space conversion may be performed by an expression for color space conversion from sYCC into CIE1931XYZ (or any of the above-mentioned color spaces) or conversion using a ICC profile.

If an original color space coincides with a luminance value color space (e.g., an original image is represented by sYCC, and the Y value of YCbCr is used as a luminance), the Y value of an original image sYCC signal need only be extracted, and color space conversion processing is unnecessary.

A scaling process is performed for the extracted luminance component image (step S302). The scaling process according to this embodiment scales the luminance image obtained in step S301 from the scanned preview image to the size of a low-resolution luminance image. Note that a known arbitrary method may be adopted as a scaling method.

This embodiment has described that the luminance signal extraction process in step S301 and scaling process in step S302 are performed in this order. The order of these two processes may be reversed. The luminance signal extraction process (step S301) and scaling process (step S301) may be performed at a time.

The luminance image generated in step S302 is stored in the RAM 106 or data storage unit 102. Since the stored data is already reduced, the storage capacity can be reduced more than a case wherein an original image is directly buffered.

With the above-mentioned processes in steps S301 and S302, a scalable luminance image is generated. In this embodiment, two kinds of scalable luminance images (of intermediate resolution and of low resolution) are generated. This generation may be implemented by changing the scaling factor in step S302 for a luminance image generated in step S301. Preferably, after an intermediate-resolution luminance image may be generated in the process in step S302 from a luminance image generated in step S301 and may be stored in the RAM 106 or data storage unit 102, a low-resolution luminance image may be generated by subjecting the intermediate-resolution luminance image serving as an input to the scaling process in step S302.

If reduction processing is performed by scaling, and the reduction ratio in the subscanning direction is not a submultiple of the band height, the entire luminance image of one band may not be reduced. However, in this case, unprocessed luminance signals may be buffered and may be subjected to reduction processing together with the remaining processing pixels of the band, upon receipt of the next band.

Figure 4:
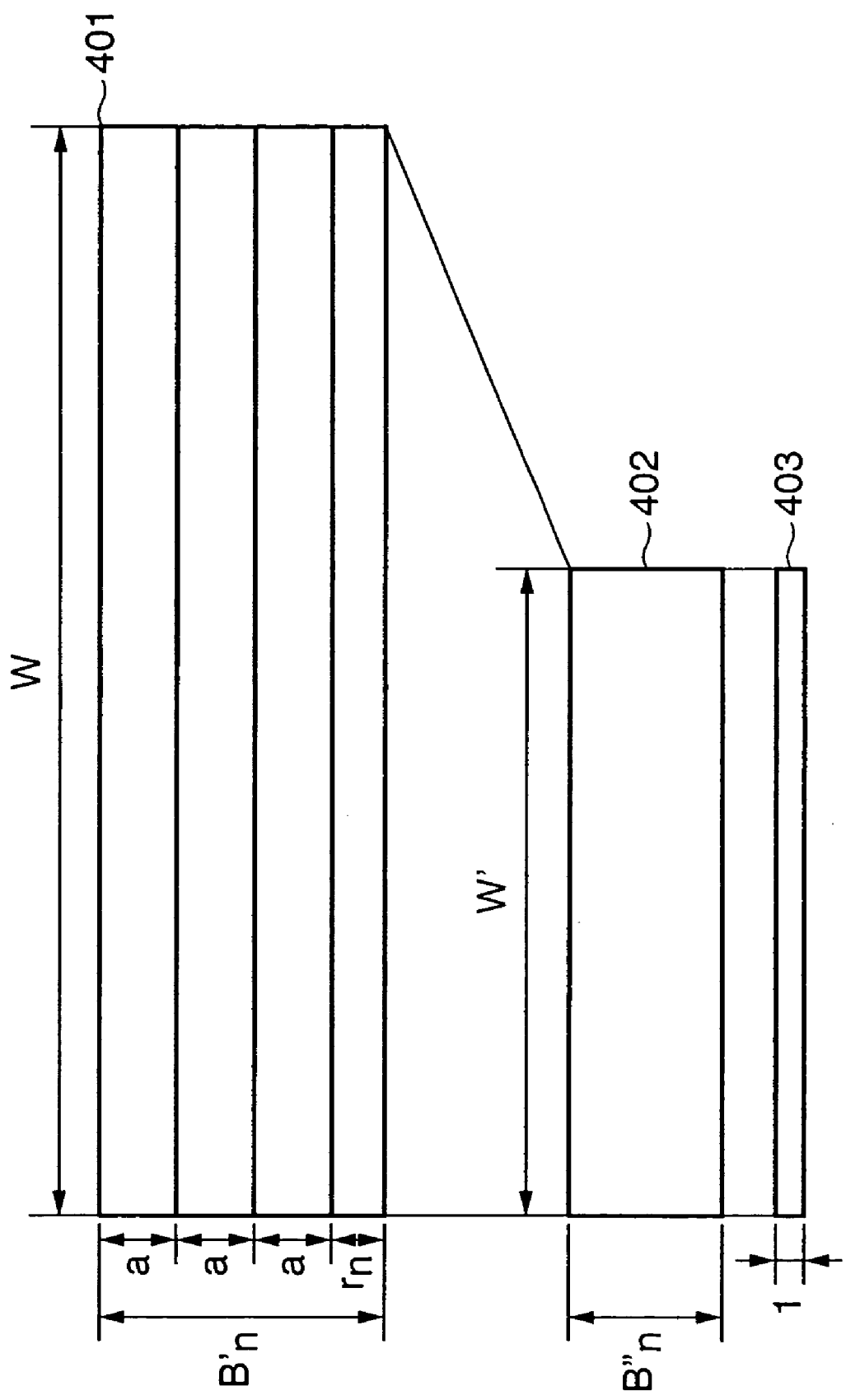
FIG. 4 is a view for explaining an example of a reduction process when the reduction ratio in the subscanning direction is not a submultiple of the band height.

FIG. 4 is a view for explaining an example of the reduction process when the reduction ratio in the subscanning direction is not a submultiple of the band height. In FIG. 4, reference numeral 401 represents the relationship between a band-like luminance image corresponding to an input band and the remainder after the reduction process. More specifically, assume that an original input band has a size of W (in the main scanning direction)×B (in the subscanning direction) pixels. In the reduction process for the nth band, letting $r_n$ be the number of remaining lines after the reduction process for the nth band, a band-like luminance image to be actually reduced has a W (in the main scanning direction)×B' (in the subscanning direction) (B'=b+$r_{n-1}$) pixels. To reduce the image, if the reduction ratio in the subscanning direction is set to 1/a, a height B" of the reduced band (reference numeral 402 in FIG. 4) becomes B"=B'/a (drop the fractional portion). If the reduction ratio in the main scanning direction is set to 1/b, a width W' of the reduced band becomes W'=W'/b, and pixels for $r_n$ ($r_n$=B'% r: where % represents remainder operation) lines remain. $r_n$ is a remainder when divided by a and reaches a−1 at most. Thus, a buffer for remaining pixels obtained by the reduction process need only have a region of (width W)×(height (a−1)).

Particularly when the reduction process is performed by simple averaging operation, all remaining lines need not be stored. It suffices to add a luminance level of (b pixels in the main scanning direction)×(a pixels in the subscanning direction) to the remaining lines in advance and hold the lines. In this case, a memory 403 of W'(W)×1 (H) will do.

It is determined in step S203 whether all bands have been processed, and the flow branches. That is, if all the bands have been processed (YES), the flow advances to step S204. On the other hand, if all the bands have not been processed (NO), the flow returns to step S201.

In step S204, low-frequency signal extraction is performed. The process in this step receives as an input the luminance image generated in the first luminance signal extraction/scaling process in step S202 and generates and outputs a low-frequency luminance image. In this embodiment, low-frequency luminance images are formed for two kinds of low-frequency luminance images, i.e., intermediate-resolution and low-resolution luminance images. To this end, the process in step S204 may be performed for each of an intermediate-resolution luminance signal image and a low-resolution luminance signal image.

The low-frequency luminance signal extraction performs, e.g., product-sum operation of a Gaussian function and an extracted luminance component as presented in non-patent reference 1 and outputs the sum of products. Note that in non-patent reference 1, product-sum operation is performed not for a luminance component of image data but directly for RGB pixels of the image data. To improve the image quality of image data, it is more preferable to perform product-sum operation using a plurality of Gaussian functions having different standard deviations and obtain luminance component distributions on a plurality of scales. The above-mentioned low-frequency luminance signal extraction process will be referred to "scaling process" hereinafter. To implement the scaling process by hardware, e.g., a product-sum operation circuit can be used.

This embodiment has described that the first luminance signal extraction/scaling process in step S202 generates intermediate-resolution low-frequency luminance image and low-resolution low-frequency luminance image. An intermediate-resolution luminance image may be generated and stored in a storage area in step S202, another step is provided before step S204 to scale the intermediate-resolution luminance image and generate a low-resolution luminance image.

The intermediate-resolution low-frequency luminance signal and low-resolution low-frequency luminance image are stored in the RAM 106 or data storage unit 102 in FIG. 1.

Then, the scanned image is input (step S205). In this step, the high-resolution image (scanned image) is scanned by one band from the image input unit 108 and is stored in the RAM 106 or data storage unit 102.

The second luminance signal extraction/scaling process is performed (step S206). The second luminance signal extraction/scaling process is the same as the first luminance signal extraction/scaling process except that an input image is a scanned image of high resolution to be corrected, and a luminance image to be generated has high resolution (the size of the image 502 in FIG. 5). Thus, the process is performed along the described flowchart in FIG. 3, and a description thereof will be omitted.

As the second low-frequency signal extraction process, a low-frequency component is extracted from the high-resolution luminance image formed in step S206 (step S207). The second low-frequency signal extraction process is the same as the first low-frequency signal extraction process except that an input image is a band-like high-resolution luminance image generated in step S206, and the process has the process for the remainder obtained in the filtering. Thus, different portions will be described below, and a description of similar portions will be omitted.

The first low-frequency signal extraction process has all luminance images serving as low-frequency signal extraction targets. Unlike this, the second low-frequency signal extraction process in step S207 needs to be performed for a band-like input signal. For this reason, a band joint process needs to be performed.

Figure 6:
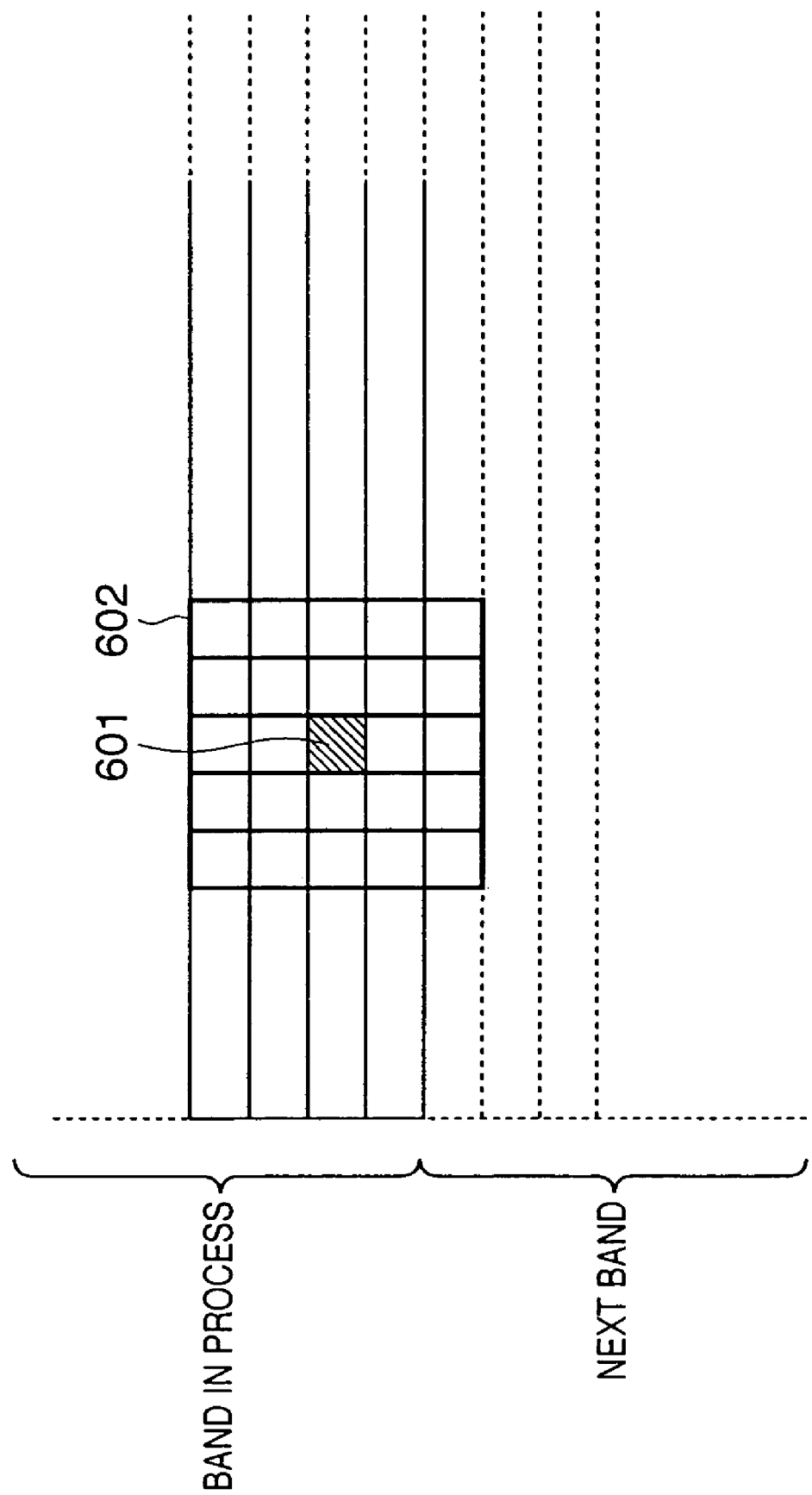
FIG. 6 is a view for explaining a band joint process in the second low-frequency signal extraction process.

FIG. 6 is a view for explaining band joint process in the second low-frequency signal extraction process. For example, assume that the low-frequency signal extraction process refers to a neighboring region 602 of 5×5 pixels around a pixel of interest 601, as shown in FIG. 6. In this case, since all pixels in the last two scanning lines are incomplete (that is, pixels of the next band are necessary), they cannot be processed. Accordingly, the pixels in the last two scanning lines are buffered and are processed together with the next band. To perform filtering for the last two scanning lines, two immediately preceding lines are also required. For this reason, pixels for four scanning lines need to be buffered and processed together with pixel data of the next band.

For a scanning line which has not undergone the low-frequency signal extraction process, subsequent color adjustment processing cannot be performed completely. Input image data for the line needs to be buffered. Since the reduction process has been performed in step S206, reduced four scanning lines, i.e., lines the number of which is a reciprocal multiple of a reduction ratio (in the subscanning direction) of 4 need to be buffered as the input image. The size of these lines is sufficiently smaller than that of the entire buffered band.

In step S208, the color adjustment process is performed using the intermediate-resolution low-frequency luminance image and low-resolution low-frequency luminance image generated in step S204, the high-resolution low-frequency luminance image generated in step S207, and the scanned image obtained in step S205.

As an example of the color adjustment process, a method based on non-patent reference 1 performs logarithmic transformation for the luminance component distribution and scaled luminance component distribution and outputs a difference between them. The weighted average of difference outputs on different scales (at different resolutions) is set as an improved luminance component. However, this method cannot adjust the improvement level in accordance with an image, and the output of logarithmic transformation of a scaled luminance component is multiplied by a coefficient. The coefficient is a parameter for adjusting the improvement level. The output of an improved luminance component based on the above-mentioned process is represented by equation (3):

$$Y'(x, y) = \sum_{n} w_n \{\gamma_0 \cdot \log Y(x, y) - \gamma_1 \cdot \log[F_n(x, y) * Y(x, y)]\} \quad (3)$$

where Y'(x,y), $F_n$(x,y), $W_n$, n, $\gamma_0$, and $\gamma_1$ are an output of an improved luminance component whose coordinate values are (x,y), a Gaussian function at the coordinates (x,y), an inter-scale weight, a parameter representing a scale, parameter 0 representing the improvement level, and parameter 1 representing the improvement level, respectively, and "*" represents product-sum operation.

It is found that the inter-scale weight can be omitted (can be replaced with simple averaging operation) by adjusting the standard deviations of respective scales, and that it is more preferable as the image quality of improved image data to re-convert a logarithmically transformed value into one in luminance by inverse transform (exp operation) than to output the logarithmically transformed value as represented by equation (3). Accordingly, an output represented by equation (4) is preferably set as an improved luminance component:

$$Y'(x, y) = \exp\{\gamma_0 \cdot \log Y(x, y) - \gamma_1 \cdot Avg\{\log[F_n(x,y)*Y(x, y)]\}\} \quad (4)$$

where Avg represents average value operation. Instead of equation (4), the following equation (5) may be used:

$$Y'(x, y) = \frac{Y(x, y)^{\gamma_0}}{[Avg\{F_n(x, y) * Y(x, y)\}]^{\gamma_1}} \quad (5)$$

The low-frequency luminance signal extraction process in step S301 may perform averaging operation for outputs of scaling on a plurality of scales, and the average value of the outputs of scaling on the plurality of scales may be used as the scaled luminance component distribution. Alternatively, to obtain the same effect as obtained in equation (5), the following equation (6) may be used:

$$Y'(x, y) = Avg\left[\frac{Y(x, y)^{\gamma_0}}{\{F_n(x, y) * Y(x, y)\}^{\gamma_1}}\right] \quad (6)$$

To implement the luminance conversion process by hardware, e.g., an average value operation circuit, a circuit which creates a lookup table, a table storage unit, a table lookup circuit (for gamma conversion), and a division circuit can be used. Note that the average value operation circuit may be provided in a portion which implements low-frequency luminance signal extraction.

The color adjustment process performs correction in accordance with a change in luminance component so as to minimize a change in color of image data after the process. Preferably, color components X(x,y), Y(x,y), and Z(x,y) are multiplied by a ratio Y'(x,y)/Y(x,y) between a luminance component before change and that after change. Alternatively, the process may be simplified. That is, only the color component Y(x,y) may be changed to Y'(x,y) by equation (5) or (6), and the color components X(x,y) and Z(x,y) may not be processed.

The X, Y, and Z data after the correction are subjected to color space conversion to obtain sRGB data. This process is the inverse transform of the color space conversion process in step S301. Thus, 3×3 matrix calculations and inverse gamma conversion are performed, and 8 bits are output for each component of sRGB. To implement the reproduction of image data by hardware, e.g., multiplication and division circuits, a matrix calculation circuit, and a table lookup circuit (for inverse gamma conversion) based on a lookup table can be used.

If another method such as conversion from sRGB into YCbCr is used as a method of extracting a luminance component in step S301, an inverse transformation process corresponding to each method is performed in this process.

In this embodiment, pixel value data after the correction is converted into an sRGB color space. This aims at returning the pixel value data into the color space before the color correction. It is not always necessary to return the pixel value data after the correction into the color space before the color correction. In accordance with the convenience to image processes subsequent to the color correction, the pixel value data may be converted into another color space (e.g., YCbCr) or may remain the XYZ data and may be stored in the RAM 106 or data storage unit 102 in FIG. 1.

If the G value of RGB or the average value of RGB signals is used as a luminance, the RGB value may be corrected by multiplying the RGB signals of each pixel by the ratio Y'(x, y)/Y(x,y) between a luminance component before change and that after change. Similarly, the Y value of XYZ, the Y value of YCbCr, the L* value of L*a*b*, or the like is used as a luminance, the RGB value may be corrected by multiplying the original RGB value of each pixel by the ratio Y'(x,y)/Y (x,y) between a luminance component before change and that after change.

The color correction process according to this embodiment has been described above. In the color correction process, there are two parameters $\gamma_0$ and $\gamma_1$ in equations (5) or (6) as ones to be determined in accordance with an image and as ones representing the improvement level. These parameters $\gamma_0$ and $\gamma_1$ may be determined in advance before the process of the flowchart in FIG. 2 or may be input by the user's operation of the input unit 101. Since these parameters need only be determined before the process in step S205, another step of causing the user to input the parameters at an arbitrary timing before the step S205 may be provided. In this embodiment, the parameters are assumed to be determined in advance. This embodiment may be arranged to determine the parameters on the basis of the luminance of a face region detected by analyzing an image.

Finally, it is determined whether all the bands have been processed, and the flow branches (step S209). If it is determined that all the bands have not been processed (NO), the flow returns to step S205, thereby performing the same process. On the other hand, if all the bands have been processed (YES), the image processing according to this embodiment ends. Preferably, a corrected image having undergone the color correction is displayed on the display unit 103, is stored in the data storage unit 102 in accordance with a predetermined image format, or is transmitted to another image processing apparatus (e.g., a printer) (not shown) through the communication unit 107.

The above-mentioned embodiment has described 8-bit unsigned integral data for each component of RGB or a real number value of 0 to 1.0 obtained by normalizing the data as image data to be processed. This embodiment can easily be applied to the case of an n-bit (n is a positive integer) unsigned integer or the like. This embodiment can also be applied to a case wherein a normalized value is a negative value or exceeds 1.0 as in bg-sRGB defined by IEC 61996-2-1 Annex G or scRGB defined by IEC 61996-2-2. In a color space which can take negative values as well, the RGB value may be converted into a luminance by, e.g., equation (1). Depending on a combination of RGB, a luminance Y calculated using equation (1) may be a negative value or exceed 1.0 after the normalization. This combination of RGB represents a non-existent color. In this case, the luminance Y is preferably set to 0.0 (when it is a negative value) and is preferably rounded (when it exceeds 1.0).

Second Embodiment

The second embodiment will describe an application wherein a plurality of images can be scanned by one image scanning operation. This embodiment will describe a case wherein a plurality of images are placed on the scanning surface of a scanner device, and they are processed.

Figure 7:
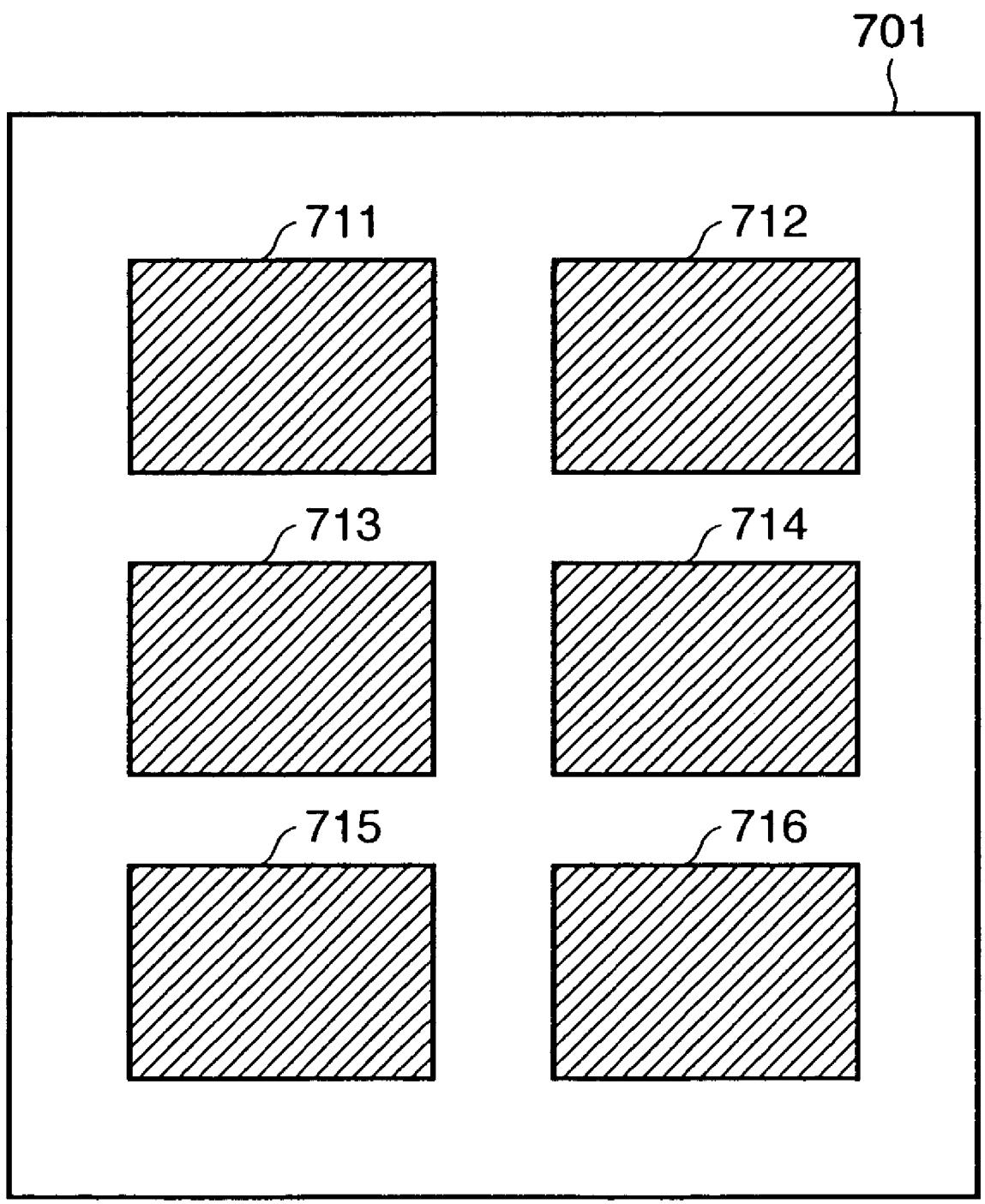
FIG. 7 is a view showing a state wherein document images (e.g. paper-printed photos) are placed on the scanning surface of a scanner device.
Figure 8:
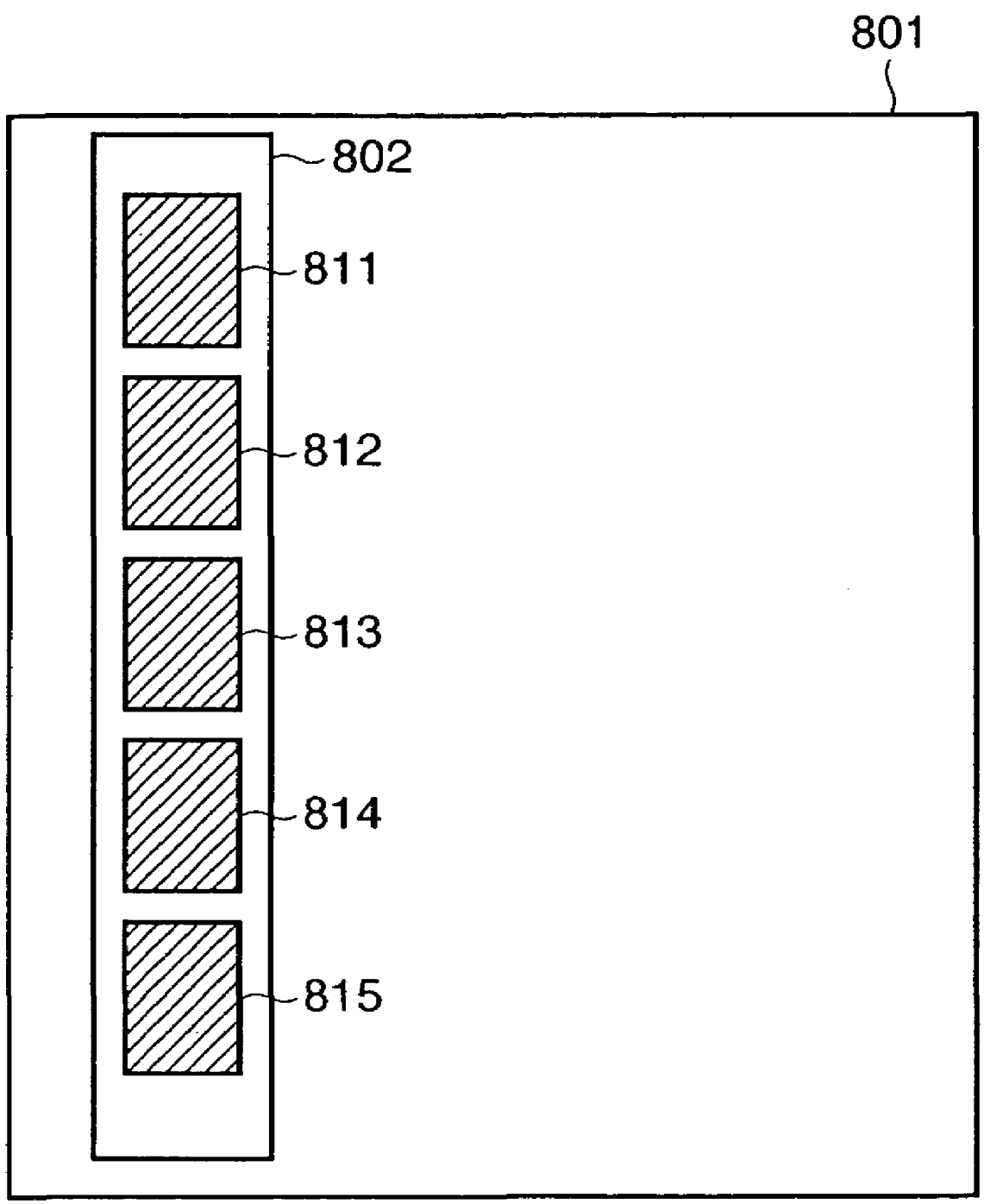
FIG. 8 is a schematic view showing how a positive or negative film stored in a sleeve 802 is placed on a scanning surface 801 of the scanner device.

FIG. 7 is a view showing a state wherein document images (e.g., paper-printed photos) are placed on the scanning surface of the scanner device. In FIG. 7, reference numeral 701 denotes a scanning surface; and 711 to 716 denote document images placed on the scanning surface. FIG. 8 is a schematic view showing how a film portion obtained by cutting a positive or negative film in a plurality of frames stored in a sleeve 802 is placed on a scanning surface 801 of the scanner device.

FIG. 9 is a flowchart for explaining the flow of processing in an image processing apparatus according to the second embodiment of the present invention. The same step numbers in the flowchart of FIG. 9 denote the same processes as those in the flowchart of FIG. 2 according to the first embodiment. In FIG. 9, the determination process for the band process in preview image scanning (step S203) is omitted. This is because this embodiment is an example of a case wherein a band process is not performed in preview image scanning. Thus, in the flowchart shown in FIG. 9, the process in step S201 and the processes in steps S201 to S901 may be performed by a band process.

Similarly to the first embodiment, a process of scanning a preview image is performed (step S201). In this embodiment, the preview image scanned in the process in step S201 is, e.g., the image 701 shown in FIG. 7 or a low-resolution image corresponding to the region 801 shown in FIG. 8.

The partial region images 711 to 716 in FIG. 7 or partial region images 811 to 815 in FIG. 8 are extracted from the preview image scanned in step S201 (step S901). Each extracted partial region image is stored in the RAM 106 or data storage unit 102. The image extraction process may automatically be performed using a known image extraction technique. As an example of an automatic image extraction process technique, e.g., a known technique described in Japanese Patent Laid-Open No. 2004-030430 can be used. Alternatively, if the sleeve 802 is provided, as shown in FIG. 8, and the schematic position of each image can be fixed, the image may be extracted on the basis of the position.

An image serving as a target for subsequent processes is designated (step S902). In this embodiment, each region image extracted in step S901 is presented on the display unit 103, and the user designates an image serving as the target by operating the input unit 101.

As for presentation of each region image, if the system is one comprising a personal computer, and the display unit 103 has high display ability, a plurality of region images can simultaneously be presented and selected, or selection of the images can be canceled.

If the display unit 103 of the system does not have high display ability, like a so-called multifunction apparatus, the region images of the preview image extracted in step S901 may sequentially be presented one by one on the display unit 103, and the user may operate the input unit 101 to switch between presentation images or perform selection/cancellation.

Indices (e.g., numerical values such as 1, 2, 3, . . . or alphabets such as A, B, C . . . ) may be determined in advance for the schematic positions of the region images, the region images serving as the extraction result may not be presented to the user, and the user may be made to designate an index through the input unit 101. In this case, the user may confirm a document image or positive or negative film in advance before the preview image scanning and may determine the positions of frames and indices assigned to them and designate one.

In the image extraction process in step S901, the entire preview image before region extraction may be presented on the display unit 103, the user operates the input unit 101 to designate at least one of the regions 711 to 716 and regions 811 to 815, and an image corresponding to the region may be extracted from the preview image. In this case, the extracted region image can be designated as an image to be processed, and the process in step S902 can be skipped.

The first luminance signal extraction/scaling process is performed for the partial region image to be processed (step S202). After that, the first low-frequency signal extraction process is performed (step S204). In the subsequent step, a portion corresponding to the region designated in step S902 is scanned at high resolution as the scanned image scanning process (step S205).

Preferably, in the scanning process in step S205, the head of the scanner comprising a CCD and the like is controlled, only the user-designated region is scanned out of the regions 711 to 716 in FIG. 7 and regions 811 to 815 in FIG. 8. However, if the scanner cannot perform such partial region scanning process, the following operations may be performed. More specifically, while the entire region, i.e., the region 701 in FIG. 7 or the region 801 in FIG. 8 is scanned by the band process, unnecessary regions are discarded. Only the image data of a necessary region is extracted and is stored in the RAM 106 or data storage unit 102.

The processes in steps S206 to S209 are the same as those in the flowchart shown in FIG. 2 according to the first embodiment except that an image to be processed is a partial region image of the scanned image obtained in step S205, and the image is used as an input, and a description thereof will be omitted.

As for the above process, if a plurality of partial regions are designated in step S902, the processes in steps S202 to S209 may simultaneously be performed. Alternatively, the processes in steps S202 to S209 may be performed for each of the designated regions.

It is determined in step S90.4 whether the above process has ended. A message such as "End Process?" is displayed on the display unit 103 to make an inquiry about whether to end the process. Determination whether to end the process may be made in accordance with an instruction from the user input by operating the input unit 101.

Alternatively, it may be determined whether all designated partial regions have been processed. It may be determined "true (YES)" if the process is completed; otherwise, it may be determined "false (NO)". This process is particularly effective in a non-interactive environment. If it is determined true in step S904, the process ends. On the other hand, if it is determined false, the flow returns to step S205 to repeat the above-mentioned processes.

During the series of processes shown in the flowchart of FIG. 9, another step of determining the presence of a cancellation instruction from the user may be provided to interrupt the process. This method is one of effective methods of increasing the operability when, e.g., the processing time is long due to high scanning resolution.

A process such as oblique correction may be performed for a partial region image as the result of the partial image extraction process in step S901.

As described above, in the second embodiment, the first luminance signal extraction/scaling process (step S202) and first low-frequency signal extraction process (step S204) are performed for designated partial regions of a preview image. As a modification, the following operation may be performed. More specifically, these steps are arranged before step S901, and the first luminance signal extraction/scaling process and first low-frequency signal extraction process are performed for the entire preview image. In step S902, a partial region to be processed is extracted from the preview image, and at the same time, is generated by extracting the partial region to be processed from a low-frequency image as the result of the first low-frequency signal extraction generated from the entire preview image to generate the first low-frequency image of the image to be processed.

According to the second embodiment, the present invention can preferably be applied to a case wherein a plurality of images are simultaneously scanned.

As has been described above, according to the above-mentioned embodiments, a low-frequency luminance component of relatively low resolution is extracted by the first image scanning, and a low-frequency luminance component of relatively high resolution is extracted by the second image scanning. With this arrangement, memory saving can be implemented, and at the same time, an influence of a positional shift generated every image scanning on color adjustment can be suppressed.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, the storage capacity required to form low-frequency components having a plurality of resolutions can be reduced. Also, a degradation in image quality due to a positional error between image data obtained as an image processing result can be suppressed.

The present invention is not limited to the above embodiments and various changes and modification can be made within the spirit and scope of the present inventions. Therefore, to apprise the public of the scope of the present inventions, the following claims are made.

[Claim of Priority]

This application claims priority from Japanese Patent Application No. 2003-392075 filed on Nov. 21, 2003, and Japanese Patent Application No. 2004-272524 filed on Sep. 17, 2004, which are hereby incorporated by reference herein.

What is claimed is:

1. An image processing method comprising:
using an image processing apparatus to perform the following steps:
a first acquisition step of acquiring, by using an image input unit, first image data of an inputted image at a first resolution;
a storage step of extracting first low-frequency components of luminance values from the first image data, and storing the extracted first low-frequency components in a memory;
a second acquisition step of acquiring second image data of each of divided areas into which the inputted image is divided, said second image data being acquired at a second resolution higher than the first resolution;
a low-frequency extraction step of extracting a second low-frequency components of luminance values from the second image data;
an image processing step of performing image processing for the second image data, using both the extracted second low-frequency components and low-frequency components of an area corresponding to the divided area in the inputted image among the first low-frequency components stored in the memory,
wherein the second acquisition step, the low-frequency extraction step, and the image processing step are performed in sequence for each of the divided areas.

2. The method according to claim 1, wherein the first low-frequency components are obtained by applying a two dimensional filter to the luminance values in the first image data.

3. The method according to claim 1, wherein the second image data is for band images into which the inputted image is segmented in a subscanning direction.

4. The method according to claim 3, further comprising a holding step of holding luminance values of a predetermined number of last lines of an immediately processed band image,
wherein the predetermined number of lines are determined on the basis of a size of a processing region of a low-frequency components extraction process to be performed for pixels in the second image data.

5. The method according to claim 1, further comprising a preview step of performing a preview on the basis of the first image data.

6. The method according to claim 1, further comprising:
a preview input st ep of optically scanning a plurality of documents arranged on a scanning surface and inputting a plurality of preview images; and
a selection step of selecting a preview image, as the inputted image, from the plurality of preview images, in accordance with an instruction from a user.

7. An image processing apparatus comprising:
a first acquisition unit configured to acquire first image data of an inputted image at a first resolution;
a storage unit to extract first low-frequency components of luminance values from the first image data, and to store the extracted first low-frequency components in a memory;
a second acquisition unit configured to acquire second image data of each of divided areas into which the inputted image is divided, said second image data being acquired at a second resolution higher than the first resolution;
a low-frequency extraction unit to extract second low-frequency components of luminance values from the second image data;
an image processing unit to perform image processing for the second image data, using both the extracted second low-frequency components and low-frequency components of an area corresponding to the divided area in the inputted image among the first low-frequency components stored in the memory,
wherein the functions performed by the second acquisition unit, the low-frequency extraction unit, and the image processing unit are performed in sequence for each of the divided areas.

8. A program stored on a computer-readable medium for causing a computer to execute a processing method comprising:
a first acquisition procedure of acquiring first image data image of an inputted image at a first resolution;

a storage procedure of extracting first low-frequency components of luminance values from the first image data, and storing the extracted first low-frequency components in a memory;

a second acquisition procedure of acquiring second image data of each of divided areas into which the inputted image is divided, said second image data being acquired at a second resolution higher than the first resolution;

a low-frequency extraction procedure of extracting second low-frequency components of luminance values from the second image data;

an image processing procedure configured to perform image processing for the second image data, using both the extracted second low-frequency components and low-frequency components of an area corresponding to the divided area in the inputted image among the stored first low-frequency components stored in the memory, wherein the second acquisition procedure, the low-frequency extraction procedures and the image processing procedure are performed in sequence for each of the divided areas.

* * * * *